United States Patent [19]
Sato et al.

[11] Patent Number: 5,328,725
[45] Date of Patent: Jul. 12, 1994

[54] METHOD OF COATING AUTOMOBILE BODY WITH CHIPPING-RESISTING PAINT

[75] Inventors: Noboru Sato; Hirofumi Kono, both of Suzuka, Japan

[73] Assignee: Honda Motor Company, Ltd., Tokyo, Japan

[21] Appl. No.: 93,887

[22] Filed: Jul. 20, 1993

Related U.S. Application Data

[63] Continuation of Ser. No. 771,989, Oct. 9, 1991.

[51] Int. Cl.$^5$ .......................... B05D 3/00; B65B 33/04
[52] U.S. Cl. ..................................... 427/156; 427/379
[58] Field of Search ................. 427/156, 155, 409, 379

[56] References Cited

U.S. PATENT DOCUMENTS

| | | | |
|---|---|---|---|
| 3,856,548 | 12/1974 | Taylor et al. | 427/409 |
| 4,199,620 | 4/1980 | Edwards et al. | 427/156 |
| 4,271,217 | 6/1981 | Tanaka et al. | 427/155 |
| 4,590,097 | 5/1986 | Booth et al. | 427/156 |
| 5,064,475 | 11/1991 | Bernasconi | 427/156 |

FOREIGN PATENT DOCUMENTS 51026943  8/1974  Japan .

Primary Examiner—Shrive Beck
Assistant Examiner—Diana Dudash
Attorney, Agent, or Firm—Nikaido Marmelstein Murray & Oram

[57] ABSTRACT

Herein disclosed is a method of coating an automobile body with a chipping-resisting paint, which comprises the steps of: applying and drying that portion of a top-painted automobile body, which is susceptible to the stone chipping, with a chipping-resisting paint containing, as a chief material, 10 to 20 parts of urethane lacquer and, as a solvent, 60 to 75 parts of isopropyl alcohol, 7 to 12 parts of toluene and 7 to 10 parts of ethyl acetate, to have a dry film thickness of at least 30 μm; stripping the applied and dried coating film of the chipping-resisting paint after lapse of a predetermined period; and applying and drying the stripped portion again with the chipping-resisting paint. These steps are repeated.

1 Claim, 1 Drawing Sheet

PRESENCE & THICKNESS OF STRIPPABLE PAINT COATING FILM

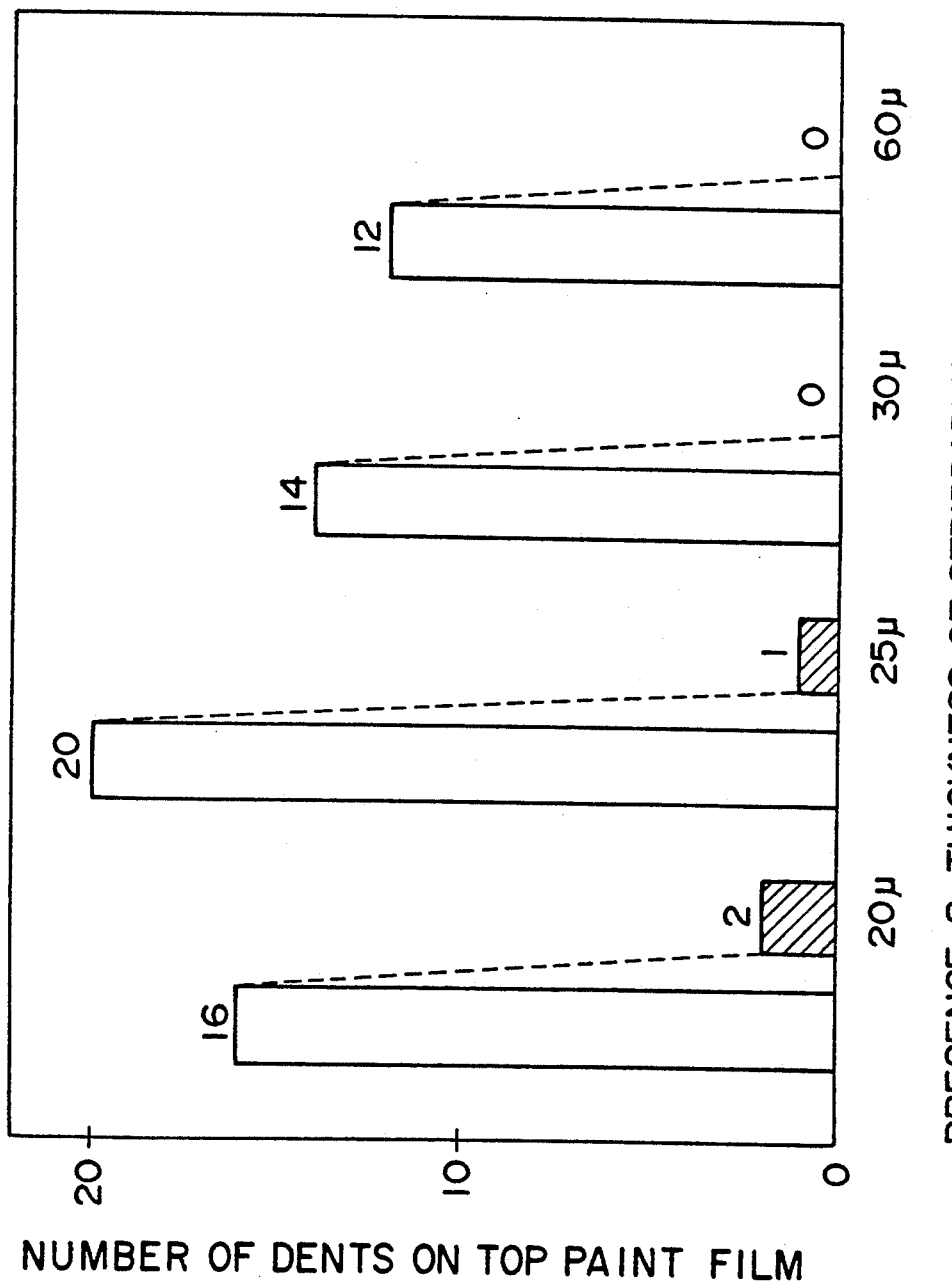

METHOD OF COATING AUTOMOBILE BODY WITH CHIPPING-RESISTING PAINT

This is a continuation, of application Ser. No. 07/771,989 filed Oct. 9, 1991.

BACKGROUND OF THE INVENTION

1. Field of the Invention

The present invention relates to a chipping-resisting paint coating method capable of preventing an automobile from having its paint film chipped or damaged by the gravel spread over the road (as will be called the "stone chipping"), to maintain the satisfactory appearance and quality of the automobile body at all times.

2. Prior Art

If an automobile runs in winter on an unpaved road of a briny land, its body is frequently dented at its hood leading end, its tire housing or its periphery by the pebbles popped up by the wheels. The dented portion will be corroded, if left untreated, as a result of the chipping. Thus, the painted surface of the car body has to be protected against the so-called "chipping damage", and a variety of means have been proposed in the prior art. In Japanese Patent Laid-Open No. 171681, for example, there is described a coating method of coating the top paint of the car body at its stone chipping susceptible portion with an urethane clear paint which contains specified amounts of polyester resin, melamine resin and cellulose acetate butyrate resin. According to the disclosure of this coating method, the urethane clear paint is baked and set to protect the top and lower paint layers of and set to protect the top and lower paint layers of the car body with the set coating film to provide a satisfactory appearance.

In the prior art exemplified above, however, the top coat has its dents left, if it is subjected to the chipping damage as the time elapses, on the set coating film of the urethane clear paint even if the top paint film is protected by the set coating film and if the damage should not reach the top paint. Thus, the method of the prior art has a defect that the appearance is deteriorated. Still the worse, the urethane clear coating film, which was once baked and set, is characteristically difficult to strip or remove from the top paint film so that it cannot be cleared of the residing dents. Thus, another difficulty is that the coating film cannot restore, if once damaged, its original appearance.

SUMMARY OF THE INVENTION

The present invention has an object to solve the above-specified problems of the prior art and to provide a coating method capable of stripping a chipping-resulting coating film on a top paint film, which has been subjected to the chipping damage, after lapse of a predetermined period by giving the coating film a stripping property thereby to form a novel chipping-resisting coating film.

In order to achieve the above-specified object, according to the present invention, there is provided a method of coating an automobile body with a chipping-resisting paint, which comprises the steps of: applying and drying that portion of a top-painted automobile body, which is susceptible to the stone chipping, with a chipping-resisting paint containing, as a chief material, 10 to 20 parts of urethane lacquer and, as a solvent, 60 to 75 parts of isopropyl alcohol, 7 to 12 parts of toluene and 7 to 10 parts of ethyl acetate, to have a dry film thickness of at least 30 μm; stripping the applied and dried coating film of the chipping-resisting paint after lapse of a predetermined period; and applying and drying the stripped portion again with the chipping-resisting paint; and repeating the foregoing steps.

The coating film, which has been prepared by applying and drying the chipping-resisting paint having the specified blending composition to have a dry thickness equal to or more than the predetermined value, protects the top and lower paint layers of the car body and gives the top paint layer a satisfactory interfacial contact and a strippability from the coating film.

BRIEF DESCRIPTION OF THE DRAWING

The accompanying drawing is a graph showing the chipping-resisting effect in case the thickness of the chipping-resisting coating film is changed in the embodiment of the present invention.

DESCRIPTION OF THE PREFERRED EMBODIMENT

As the chipping-resisting paint (as will be called the "strippable paint"), urethane lacquer, isopropyl alcohol, toluene and ethyl acetate are blended at composition ratios, as enumerated in the upper rows of Table-1. The strippable paints thus prepared are confined together with dimethyl ether aerosol gases in a known spray can. The viscosity of the strippable paint at this time is 90 poises at 25° C. On the other hand, a rectangular steel plate having a length of 150 mm and a width of 70 mm is coated with three lower, intermediate and upper paints and baked three times to form a substrate having a coating film thickness of 130 μm. A test piece is prepared by spraying the substrate with the strippable paints having the aforementioned individual compositions and is dried to have a dried coating film thickness of 30 μm.

The results of testing the characteristics of the individual test pieces are enumerated in the lower rows of Table-1. In the Test Items, the "Visual Test" of appearance examines the propriety of smoothness and sags of the coating face of the strippable paint film. The "Interfacial Contact" of the top paint film is judged by visually inspecting the interfacial contact (i.e., the lifting) between the strippable paint film and the substrate after the low-temperature chipping tests. These tests are accomplished by hitting the strippable paint film with 50 g of pebbles of size No. 7 according to the Japanese Industrial Standards, which are discharged at a temperature of −20° C., at a test piece angle of 90 degrees and under a discharge pressure of 4 Kg/cm² by using the gravel meter. Next, the "Strippability" is the stripping feasibility, when the strippable coating film after the aforementioned low-temperature chipping test is partially removed by a nail and is pulled and stripped from the removed portion by the finger, and decides whether or not the film is completely stripped. Moreover, the "Sprayability" decides the presence of the tail of the coated face and the insufficiency of atomization when the strippable paint is sprayed and applied to the substrate. In the characteristic test results, the symbols O indicate "Good", and the symbols x indicate "No Good".

As is apparent from the characteristic test results, the test piece using the strippable paint having a blending composition within the range of 10 to 20 parts of urethane lacquer, 60 to 75 parts of isopropyl alcohol, 7 to 12 parts of toluene and 7 to 10 parts of ethyl acetate is good in all of the characteristics—the visual test of appearance, the contact with the top paint, the strippability and the sprayability. If, however, the number of blending parts of the urethane lacquer is less than 10 parts, the film formability is inferior and difficult to achieve a desired film thickness. If, on the other hand, the number of blending parts exceeds 21 parts, a problem arises in the sprayability, as exemplified in Comparison 1. If the number of blending parts of isopropyl alcohol is less than 60 parts, the smoothness of the surface of the strippable paint film is bad, as exemplified in Comparison 2. If, on the other hand, the number of blending parts exceeds 75 parts, the sags likewise occur on the paint surface, as exemplified in Comparison 3. If the number of blending parts of toluene is less than 7 parts, the quick-drying properties are bad. If 12 parts is exceeded, the drying process advances so fast that the smoothness of the surface of the strippable paint film is bad, as exemplified in Comparison 4. If the number of blending parts of ethyl acetate is less than 7 parts, the interfacial contact with the surface of the top paint film is bad, as exemplified in Comparison 5. If the number of blending parts exceeds 10 parts, a problem arises in the strippability from the surface of the top paint film, as exemplified in Comparison 6.

TABLE 1

|  |  | EMBODIMENT | | | | | COMPARISON | | | | | |
|---|---|---|---|---|---|---|---|---|---|---|---|---|
|  |  | 1 | 2 | 3 | 4 | 5 | 1 | 2 | 3 | 4 | 5 | 6 |
| Composition | Urethane Lacquer | 15 | 20 | 10 | 18 | 11 | 21 | 19 | 10 | 15 | 18 | 15 |
|  | Isopropyl Alcohol | 69 | 61 | 70 | 60 | 75 | 60 | 59 | 76 | 62 | 64 | 62 |
|  | Toluene | 8 | 10 | 10 | 12 | 7 | 10 | 12 | 7 | 13 | 12 | 12 |
|  | Ethyl Acetate | 8 | 9 | 10 | 10 | 7 | 9 | 10 | 7 | 10 | 6 | 11 |
| Characteristics | Visual Test | ○ | ○ | ○ | ○ | ○ | ○ | x | x | x | ○ | ○ |
|  | Interface Contact | ○ | ○ | ○ | ○ | ○ | ○ | ○ | ○ | ○ | x | ○ |
|  | Strippability | ○ | ○ | ○ | ○ | ○ | ○ | ○ | ○ | ○ | ○ | x |
|  | Sprayability | ○ | ○ | ○ | ○ | ○ | x | ○ | ○ | ○ | ○ | ○ |

Note:
Numerals indicate numerical values in parts; and Symbols * outrange the part limits.

Next, the relations between the coating thickness of the strippable paint and the chipping-resisting effect will be described in the following. The strippable paint, which was prepared by blending, as a chief material, 15 parts of urethane lacquer and, as a solvent, 64 parts of isopropyl alcohol, 9 parts of toluene and 9 parts of ethyl acetate, is confined with a dimethyl ether aerosol gas in a known spray can. The viscosity of the strippable paint at this time is 90 poise at 25° C. This strippable paint is applied to the surface of the top paint film of the aforementioned substrate, which has its generally half area shielded, and is dried to have individual dry thicknesses of 20 μm, 25 μm, 30 μm and 60 μm thereby to prepare four kinds of totally sixteen test pieces. As a result, each of the test pieces has its general half formed with the strippable paint film and its remaining half not formed with the film but left with the top paint film as it is. The individual test pieces were subjected to the low-temperature chipping test under the same conditions as the aforementioned ones, and the number of dents formed on the top paint film and having a size of 1 mm φ or more was measured. These measurement results are presented in a graph in the accompanying drawing. In the low-temperature chipping tests, the portions of the test pieces, which are not coated with the strippable paint, are directly hit by the discharged pebbles so that the top coating film is directly chipped and damaged. Since, however, the coated portions of the top paint film are protected by the strippable paint coating film, the less pebbles reach the surface of the top paint film as the strippable coating film has the larger thickness, so that the top paint film is the less dented.

As is apparent from the drawing, the portions uncoated with the strippable paint are formed on an average with about fifteen dents, but the top paint film coated with the strippable paint film having a dry thickness of 30 μm has a zero chipping damage. As a result, the reliable chipping-resisting effect can be achieved if the dry film thickness of the strippable paint over the top paint film is made larger than 30 μm or more. Incidentally, the individual test pieces coated with the strippable paint coating films having different dry thicknesses were also tested like before in their characteristics—the interfacial contact with the top paint film and the strippability. The test results are enumerated in Table-2 and Table-3, which reveal good results:

TABLE 2

| Interfacial Contact of Strippable Paint Coating Film with Top Paint Film: | | | | |
|---|---|---|---|---|
| Film Thickness | 20 μm | 25 μm | 30 μm | 60 μm |
| No. 1 | ○ | ○ | ○ | ○ |
| 2 | ○ | ○ | ○ | ○ |
| 3 | ○ | ○ | ○ | ○ |
| 4 | ○ | ○ | ○ | ○ |

TABLE 3

| Strippability of Strippable Paint Coating Film | | | | |
|---|---|---|---|---|
| Film Thickness | 20 μm | 25 μm | 30 μm | 60 μm |
| No. 1 | ○ | ○ | ○ | ○ |
| 2 | ○ | ○ | ○ | ○ |
| 3 | ○ | ○ | ○ | ○ |
| 4 | ○ | ○ | ○ | ○ |

As is apparent from the characteristic test results of the strippable paint film, the dents can be prevented from reaching the top paint film by forming the strippable paint film having the aforementioned blending composition and the dry thickness of 30 μm or more in those portions of the automobile body having the top paint film, which are susceptible to the stone chipping. After the run of the automobile for a considerable period, the strippable paint coating film will naturally be deteriorated with a number of dents to have a bad appearance. This appearance and quality can be maintained in a good state if the strippable paint film is stripped to expose the top paint film to the outside and renewed by a strippable paint film at an interval of every three or four weeks.

Incidentally, the atomization with the spray can is employed in the present embodiment for applying the strippable paint. Despite of this fact, however, a similar chipping-resisting effect can naturally be achieved even if the application is effected by means of a brush or an ordinary spray gun.

According to the coating method of the present invention thus constructed, the chipping-resisting paint having a predetermined film thickness or more is applied to and dried on those portions of the automobile body, which are susceptible to the stone chipping. As a result, the chipping damage, if any, will not reach the top paint film so that the reliable chipping-resisting effect can be achieved. Since, moreover, the chipping-resisting coating film is composed chiefly of the urethane lacquer and is sufficiently extendible, it has an excellent interfacial contact with the top paint film and an excellent strippability so that it can be easily stripped with the hand without use of any remover. If, therefore, the procedures of stripping the coating film at the time, when the chipping-resisting coating film is aged or has its appearance deteriorated by the numerous dents a predetermined period after it is applied to and dried on the completed car body, and applying and drying the chipping-resisting paint again to the stripped portions are repeated, the renewed chipping-resisting coating film restores a beautiful appearance. Thus, the present invention has an effect that the satisfactory quality can be maintained by the easy means.

What is claimed is:

1. A method of coating an automobile body with a chipping-resisting paint, comprising the steps of:

applying and drying to a painted surface of an automobile body a chipping-resisting paint comprising 10 to 20 parts of urethane lacquer and, as a solvent, 60 to 75 parts of isopropyl alcohol, 7 to 12 parts of toluene and 7 to 10 parts of ethyl acetate, to produce a dry film having a thickness of at least 30 $\mu$m;

stripping the applied and dried film of said chipping-resisting paint; and repeating the applying and drying steps to produce a second dry film of said chipping-resisting paint on said painted surface, said film having a dry thickness of at least 30 $\mu$m.

* * * * *